United States Patent Office 3,320,070
Patented May 16, 1967

3,320,070
VEGETABLE BASE HIGH PROTEIN
FOOD PRODUCT
Warren Emery Hartman, Worthington, Ohio, assignor to Worthington Foods, Inc., Worthington, Ohio, a corporation of Ohio
No Drawing. Filed May 27, 1963, Ser. No. 283,546
18 Claims. (Cl. 99—17)

This invention relates to food products and more particularly to a novel vegetable base high protein food product closely resembling a natural meat product in taste, texture and appearance, and to a process for its preparation.

It has previously been proposed to prepare meat-like products from man-made fibers obtained from vegetable proteins. Briefly stated, it has been taught that meat-like products can be prepared from molecularly-oriented edible fibers extruded from a mass of natural protein, said fibers being held together by means of edible proteinaceous binders.

A previously proposed process for the manufacture of such products comprises preparing a quantity of filaments of protein material by dispersing protein material, such as soybean protein, in a suitable dispersing medium wherein the protein is solubilized, forcing the dispersion through a spinneret similar to those used in the production of textiles, and passing the streamlet obtained thereby into a coagulatory bath which is generally an acid salt solution. The streamlets coming through the spinneret are thus precipitated in the form of filaments. The diameter of the filaments can vary depending on the orifice sizes of the spinneret. One spinneret can produce several thousand filaments which then can be grouped together to form a group of filaments. If a battery of spinnerets are employed, a considerable number of these "bundles" of filaments are formed, which when assembled together, constitute what is known in the art, as a "tow" of filaments. In order to convert the filaments which have been produced into a meat-like product, it has also been proposed that the filaments be initially freed from excess salt solution and then treated with edible binders, and that various types of meat be simulated by passing the proteinaceously bound filaments through a bath of melted fat, either as single bundles or as a tow, or by extending a ribbon of fat through the tow. Thus the final piece of meat-like product is the proteinaceously bound tow, treated with the desired fat.

In its broadest product aspect, the present invention contemplates meat-like products consisting essentially of bound man-made fibers of vegetable protein having zones simulating the appearance of lean portions of natural meat and other zones simulating the appearance of non-lean portions. These products may simulate in appearance such meats as bacon, pastrami, corned beef and the like. One of the outstanding advantages of the products of the invention is that they may be substantially fat-free or may contain fat in any desired proportion. However, in the practice of this invention, the zones simulating both the fat portions of the natural meat, as well as the zones simulating the lean portion thereof, comprise the bound (preferably proteinaceously) man-made vegetable protein (fibers. Various additives (including fat) may also be incorporated, in disseminated form, in any desired proportion that does not deleteriously affect to a substantial degree the properties of the product.

Meat in the form of animal flesh, fish, and crustations has been the common source of high protein food for ages. This has overlooked the fact that there is a class of people who for medical reasons should not eat such meat, as well as those who for religious or other reasons do not eat any meat or only certain kinds of meat (for instance no meat of cloven hoofed animals). Among these are the vegetarians, Adventists, Jews, and most Catholics on Fridays. There is, accordingly, a need of a vegetable base, high protein food as such and not as an imitation of or substitute for anything. However, even here we are faced with the matter of familiarity of appearances (yellow for butter and hence oleomargarine is colored yellow to make it desirable and palatable even though it is needed as such due to its lower content of unsaturated fats), and flavor.

The appearance of pork chops, beef steaks, bacon, et cetera, is familiar to almost every one as is the smell of same while cooking, its chewiness, and flavor as known from experience, word of mouth, or otherwise. Accordingly, even though a vegetable base high protein food is wanted, as such, the common procedure is to shape, color, and/or flavor the vegetable base product so that it looks and smells familiar to the buying public, in order that they will be more inclined to buy same even though it is what they wanted in the first place. There are, of course, matters which must be considered in the final product in order to make it fully acceptable to the buying and consuming public and these involve appearance, fibrous qualities, flavor, nutritive value and chewiness. It is an adequate solution of these matters which is needed and with which the present invention deals, and which led to the conception and development of the present invention.

In accordance with the present invention, the novel vegetable base high protein meat-like food product consists essentially of a coherent body of molecularly oriented man-made fibers of natural vegetable protein held together by means of an edible binder, said product containing meat-like flavoring and said body having zones simulating in appearance lean portions of meat and other zones simulating in appearance non-lean portions.

The novel products of the present invention can be produced by forming a body, in the form of a slice, ribbon, slab or the like, of man-made molecularly-oriented fibers of natural vegetable protein held together by an edible binder, incorporating a meat-like flavoring material, and coloring at least some but not all of the areas thereof to impart to such colored areas the appearance of the lean portion of natural meat, whereby said product has the familiar appearance of meat having lean and non-lean portions.

As indicated above, the meat-like product of this invention may represent a wide variety of variegated or striated food compositions, ranging from slices, strips, ribbons, slabs and the like, of simulated corned beef, pastrami, ham and the like, to possible meat-like novelty products containing a wide variety of colors wherein the simulated non-lean portion can represent a portion colored in a manner which does not suggest lean meat. The food product of this invention preferably is substantially fat-free (hence, more easily dehydratable), is of low caloric count (as contrasted with fat) and high-nutritive value and has substantially the same texture, taste and advantageously the appearance of an identifiable natural meat product.

However, the invention is primarily directed to a bacon-like product which has the appearance, taste (when cooked to the same degree as the natural product) and texture of natural bacon. It is also to be understood that the particularly preferred final product, i.e., the strip-shaped (preferably bacon-like) slice having the appearance of natural meat with a lean portion and a fat-like portion can be produced from a number of intermediate products, which are also within the scope of this invention. These intermediate products and their method of preparation, as well as the method of preparation of the strip-shaped slice product, are also within the scope of this invention.

The strip-shaped (hereinafter usually referred to, for convenience, as bacon-like) slices can be produced from a ribbon of proteinaceously bound man-made protein fibers cut into the desired length and colored to simulate the texture and appearance of a natural bacon slice. However, in another aspect of this invention, the bacon-like slices can also be produced from a slab prepared by heat-setting a mass of proteinaceously bound molecularly-oriented man-made vegetable protein fibers, to which bacon flavoring has been added, transversely slicing the slab and subsequently coloring the slices obtained therefrom to simulate the desired appearance.

The slices obtained either from the ribbon or from the single-layered slab can be colored in a wide variety of ways. For example, zones thereof can be colored by mechanical means to simulate the lean portions of the meat, or more preferably, a color-stamping device can be employed for this purpose which will "stamp" the slices to imprint the desired coloration thereon. It is to be noted that a particularly surprising feature of this invention resides in the fact that a fat-like portion can be simulated without the addition of any color to said portion. Thus a slice having some but not all zones colored to simulate the lean portion, will, after heating, have the general appearance of a bacon-like product with a lean portion and a fat-like portion.

However, a particularly preferred method in the practice of this invention of producing the individual bacon-like slices having substantially the same coloring and appearance as well as the taste, chewiness and texture of natural bacon slices, is to slice transversely a multilayered bacon-like slab product. This slab product is prepared by forming an initial layer of molecularly oriented man-made fibers of natural vegetable protein held together by means of an edible binder, then forming at least one other layer in like manner and placing the same on said initial layer, incorporating a meat-like flavoring material to at least one and desirably to a plurality of layers, coloring at least one but not all of said layers with food coloring agents to impart the color of the lean portion of natural bacon thereto, and heat-setting the plurality of layers to form a slab having the appearance of natural bacon, i.e., having the appearance of lean portions and fat-like portions.

A critical feature of the slab composed of a plurality of alternatively disposed layers is that it is transversely sliceable such that the slices obtained have the substantial coloring and appearance, as well as the taste, chewiness and texture of natural bacon slices without requiring an additional step of either stamping or coloring (zones of the slices) in order to simulate the desired appearance.

In the case of the bacon-like slab product of this invention, flavoring materials impart a bacon-like flavor, and selected coloring agents impart to the treated layers the color of the lean portion of natural bacon, so that the slab itself has the appearance, and texture of a vertically or transversely sliceable natural bacon slab, the colored layer or layers thereof comprising a simulated lean portion and the uncolored layers simulating a fat-like portion.

A particularly unique concept inherent in the multi-layered slab embodiment of this invention is that of coloring some but not all of the layers of the slab to simulate the lean portion of the food product. It is to be noted that in the case of the bacon-like product, the same binder can be employed for both the simulated lean and non-lean portions, although as will be described hereinafter, some variance in the type of binder can be effected to simulate further the difference between the lean and non-lean portion of natural bacon, even as to texture and chewiness as well as to taste and appearance. However, for quantity production, it is generally preferable to employ the same binder for both the lean and non-lean portions of the bacon-like product and to define the portions purely as a function of coloring. It is to be noted that because of the unique coloring feature both the slab and (of even greater significance) the slices cut therefrom, will closely resemble the corresponding natural product.

In addition to the foregoing, simulated bacon slices obtained from the multilayered slab embodiment of this invention are superior to the colored slices obtained from other intermediate products in degree of toughness, i.e., the slices from the preferred embodiment are less tough; in chewiness, i.e., the slices from the preferred embodiment have more of the chewiness of slices of the natural product; and in general, in overall meat-like quality. In all instances (from any intermediate product), the slices obtained need not be fried or broiled for maximum tastiness and palatability, though such can be done if desired. Indeed it is a particular advantage of the products of this invention that they are more easily preservable if they are not fried and, of course, will meet the most preferential criteria of this invention, i.e., of being relatively and preferably substantially fat-free. By "relatively fat-free" is meant relatively fat-free with respect to the amount of fat contained in the natural product which the product of this invention simulates. It should be again noted, however, that the fat content of the food product of this invention can be adjusted to any desired level. A food product such as a bacon-like product containing less than 18% fat can be considered, relatively speaking, to be "substantially fat-free."

In the preferred multi-layered slab embodiment of this invention, it is also desirable to dispose the proteinaceously bound man-made protein fibers in random and at least substantially unoriented fashion within each layer. By this preferred practice, a product is obtained which will have the most superior vertical slicing characteristics. Moreover, the slices obtained therefrom will have superior tenderness, texture and chewiness.

The taste of the bacon slices obtained from any of the intermediate products of this invention can be further enhanced if either the multilayered heat-set slab, the single-layer heat-set slab or the ribbon precursor products, or the individual slices cut therefrom, are smoked. In this regard, it has been found that smoking the individual slices is more advantageous than smoking the intermediate bulk products per se. Smoking will also enhance the natural appearance of the product.

The man-made fibers employed in the practice of this invention can be produced by the previously proposed procedure described above. As indicated previously, in th slab product of this invention, they are preferably disposed randomly in at least substantially unoriented fashion in each layer thereof. For optimum taste, chewiness, texture and appearance, the man-made fibers initially employed in forming the layers should range from not less than about ¼" to not more than about 5" in length.

However, the fiber lengths are but one of the many variables which are of importance in obtaining an optimum product. Other variables include the percentage of the fibers (tow) in the overall product, the amount and type of binder, the percentage of moisture in the tow and final product, the pH of the tow and final product, the amount and type of flavoring additives used, and the process conditions employed in making the product.

The amount of tow employed will depend on the type of product desired but generally will reside in the range of from about 25 to 70% by weight of the slab. However, it has been determined that amounts of tow in the range of 30 to 50% by weight of the food product of this invention are preferable. The tow should also preferably be made of spun soybean fibers though it is within the scope of this invention to employ fibers spun from other vegetable or non-meat proteins such as peanut, casein, sesame seed, corn and cottonseed meal protein.

The choice of a suitable binder for the simulated bacon product is also of great importance. While a bacon-like product can be obtained using a wide variety of known binders selected from among cereal and non-cereal type proteinaceous material, as well as from starches, dextrins and the like, it has been found that for proper firmness at least part of the binder should comprise egg albumin. However, for optimum results, it has been found that a binder comprising a combination of albumin and a neutralized soya protein (about pH 7.0) is most desirable. Of the latter soya type proteins, isolated soya proteinates and in particular alkali metal and alkaline earth metal soya proteinates, e.g. sodium, potassium, calcium soya proteinates, are particularly useful.

The aforesaid albumin and soya sodium proteinate binder has been found to be most preferable in imparting the desired firmness and crispiness to the finished product. If the soya protein binder is used alone, it is to be understood that a bacon-like product can be obtained but it will be relatively soft and lack the exact texture, chewiness and firmness of bacon. On the other hand, the use of an albumin binder alone will impart to the bacon-like product many of the qualities of natural bacon but the end product will lack the desired crispness of the natural product. When the combined albumin and soybean binders are employed together, however, these disadvantages noted when each of these ingredients are used alone, are surprisingly overcome.

The amount of binder employed in the product of this invention will vary, of course, depending on the type of binder used. For example, in the practice of this invention, as it pertains to the multi-layered slab product, it has been found that the percentage range of binder to the overall slab product should range from about 30% to about 60% by weight. In this regard, the term "binder" denotes the weight of the solid matter, e.g., albumin and soy protein, and the water employed therewith. However, as indicated previously, the type of binder very often determines the amount useful in forming the inventive product. For example, if albumin is employed solely as the binder, the effective amount thereof will vary widely depending on the degree of firmness desired in the bacon product. In this regard, an effective amount can comprise as low as 4% by weight. On the other hand, the maximum amount would be determined purely by considerations of practicality and may be 30 percent or more. However, if a relatively soft food product is desired, a neutralized alkali metal soya proteinate may be employed in the range of about 15 to 30% by weight of the overall product.

It can also be seen that the texture and firmness of the multi-layered slab product of this invention can be varied, layer by layer, by varying the amount and type of binder. Thus, for example, a desirable bacon slice can be obtained from a slab wherein the simulated lean portion comprises a relatively high percentage of albumin binder while the simulated non-lean portion comprises a lower amount of albumin binder and a larger amount, relatively speaking, of a soy protein binder. For example, the lean layers could contain a binder having an albumin to soya proteinate ratio of between 10:1 and 3:2, while the non-lean layers could contain a binder having an albumin to soya proteinate ratio of between 1:1 and 1:3.

It is also to be understood that the concentration of the binder employed is another variable in the practice of this invention. For example, the preferred aqueous dispersion of albumin and soy protein binder employed in the practice of this invention can have an effective concentration of from about 6 to about 30% by weight, with 15–18% being most preferred.

The amount of water in the food product of this invention and in the tow employed initially is another important variable. It has been found that for the practice of this invention, the percentage of water contained in the tow used to prepare the random dispersion of fibers should be from about 50 to about 70% by weight of the tow, but preferably from 58 to 63% by weight of the tow. Excessive moisture will affect the ability of the product to be formed or "set up" by heating. Moreover, if the amount of moisture is not controlled, then in order to get the desired product, i.e., the proper consistency or structure, the other variables of the invention must be comparably altered, e.g., the moisture contents relating to the other constituents must be added or subtracted accordingly. Thus, if more than 70% water is employed in the tow the concentration of all of the other materials will be affected and hence, these must be adjusted subsequently to get the proper, desired product. In like manner, if less than 50% water is contained in the tow, a reverse adjustment, including the length of cooking, must be effected. At any rate, the moisture content of the precooked slab should contain from 50% to 70% by weight of moisture. It is most desirable, however, under the preferred conditions of this invention, to have a finished product which, after being set by cooking, has a moisture content of about 60%.

The multi-layered slab product of this invention should preferably have a pH in the range of about 5.8 to about 6.2. In this regard, in the washing of the tow preparatory to cutting the latter in the fiber lengths which are preferred in the practice of this invention, a pH of about 4 to about 7 has been found to be useful.

As indicated previously, bacon-like or meat-like flavoring components are known in the food art. In the practice of this invention, any suitable flavor additives can be employed. However, a particularly preferred bacon flavoring component has been found to comprise a combination of autolyzed and hydrolyzed yeast extracts, monosodium glutamate and smoked yeasts, such as Torula yeast, along with amounts of salt, spices and vegetable extracts, as well as hydrolyzed vegetable proteins. Naturally, the amount of the flavoring ingredients will vary widely depending upon individual taste preferences.

A wide choice of known food coloring additives can be employed, a combination of FDC #2, FDC #4, plus caramel coloring, having been found to be most desirable in obtaining the desired lean coloring.

The preferred embodiment, i.e., of the slab-formed product, of this invention can be prepared by disposing alternate layers of proteinaceously bound synthetic fibers which are either initially or subsequently flavored and colored, followed by heating to set up the desired slab product. As indicated previously, while it is possible to dispose the proteinaceously bound man-made vegetable fibers in substantially oriented fashion, it is greatly preferred in the practice of this invention to form each layer of proteinaceously bound man-made fibers so that the fibers are disposed in random and in at least substantially unoriented fashion. A preferred procedure, therefore, of preparing the novel food product of this invention is to initially form a layer of tow fibers and binder, coloring and flavoring components. Additional layers can then be formed in the same manner and disposed alternatively, above the initial layer, with, however, the coloring components being omitted from certain layers. Thus, for example, in the case of the simulated bacon product, the layers are preferably red (coloring matter added), white (coloring matter not added), red, white, etc.

The mixing of the binder with the fibers preparatory to forming the layers is an important step in the preferred process of forming the slab product of this invention. A complete mixing should preferably be effected in order to obtain the preferably disoriented mass of fibers and binding materials. Before mixing, the tow should be initially cut to the desired length, i.e., such that the fibers mixed with the binder have lengths of between about ¼" and 5". It should be again noted that while the binder is mixed with the cut fibers of the tow to form the layers, in the preferred method of forming the slab product, the flavoring and coloring (if desired) components previously discussed are also added therewith in the mixing step. A substantial number of the tow fibers, it should be noted, should most desirably be employed in bundles when mixed with the binder, flavoring and coloring ingredients. If the tow fibers comprise a substantial assemblage of bunlles, which are thereupon specifically disposed in random and unoriented fashion, the texture of the food produced is enhanced thereby.

Following the mixing step and the preparation of the layers, the uncooked slab thus formed should then be heated to obtain the finished product, i.e., the vertically or transversely sliceable slab. The internal temperature which the slab should attain should range between about 160° F. and about 200° F. with a temperature of between 165° F. and 175° F. being preferable. Within this range, the product will set up in the manner desired and will not be either too soft, too hard, or too brittle. The term set up defines the formation of a congealed identifiable mass as the result of the application of heat thereto. Any acceptable heating medium can be employed. In this regard, standard hot air ovens are useful but microwave ovens can also be employed. If microwave cooking is used to prepare the finished product, the time of cooking can be greatly diminished.

Following cooking, the slab can then be smoked until the desired color is imparted to the product. As indicated previously, smoking enhances the taste and appearance of the product. It also, moreover, increases the shelf life of the slab or mold product. If desired, individual slices can be separately smoked. If this procedure is followed, the smoking time can be shortened appreciably and the individual bacon slices will have an improved appearance and taste. The individual slices can be further cooked by infrared means to obtain the desired crispiness.

The following examples will further illustrate the scope of this invention. Unless otherwise indicated, the parts and percentages employed therein are by weight. It is to be understood that these examples are purely illustrative and are not to be considered in any way as a limitation of the scope of the subject invention.

*Example I*

A bacon-like slab product according to this invention was prepared from the following relative proportions of ingredients:

| | Percent |
|---|---|
| Protein tow (spun and stretched soybean protein fibers, ¼″–5″ in length, containing 60% moisture and a pH of 5.9) | 33.26 |
| Neutralized soya sodium proteinate binder | 5.85 |
| Albumin | 3.51 |
| Autolyzed and hydrolyzed yeast extract (with salt, spices and vegetable extract (celery and onion) added) | 3.42 |
| Monosodium glutamate | 1.03 |
| Smoked Torula yeast (with hydrolyzed vegetable protein and salt added) | 1.68 |
| Vegetable gum stabilizer | 0.07 |
| Corn oil | 12.26 |
| FDC Red #2—(red coloring) | 0.09 |
| FDC Red #4—(red coloring) | 0.23 |
| Caramel | 0.09 |
| Water | 38.50 |

Water, red coloring, soybean proteinate binder, albumin, autolyzed and hydrolyzed yeast extract, monosodium glutamate, smoked Torula yeast and vegetable gum stabilizer are mixed in the proportions indicated above at room temperature. The vegetable gum stabilizer employed is a guar gum. However, it can also be a seaweed extract or locust bean gum and the like. The corn oil is then added thereto and this combination is then mixed for about 3 to 7 additional minutes. Spun and stretched soybean protein fibers in the indicated proportion cut in lengths of from ¼″ to 5″ are then added to this mixture and a complete mixing in an aluminum foil encased tray 14″ by 16″ in size, is carried out, whereby the fibers or bundles thereof are dispersed in random and unoriented fashion in the initial binder-containing mixture. After thoroughly mixing the ingredients to form a mass having a dough-like consistency, a roller is employed to level out the ingredients to form a red layer.

In like manner, a second layer is formed without, however, the addition of red coloring material. This white layer is then placed on top of the initial red layer.

In like manner, a further red layer is then formed, followed by another white layer until a slab of about 1½″ in height is obtained, each layer averaging about ⅜ inches in thickness. The red and white layered slab is then placed in an oven and heated to a temperature of about 165° F. for about seventy minutes to set the slab, the temperature representing that noted in the center of the slab. At the end of the heating period, a sliceable, cooked, bacon-like slab is obtained having substantially the appearance and product identity of a natural bacon slab. Following this heating, the inventive product is sliced and the individual slices are smoked in a smoking chamber until the desired simulated appearance of smoked bacon slices is effected.

*Example II*

Another bacon product was prepared from ingredients in the following proportions substantially following the process steps as set forth in Example I:

| | Percent |
|---|---|
| Soybean fibers—60% moisture | 38.9 |
| Water | 38.1 |
| Neutralized soya sodium proteinate | 4.9 |
| Albumin | 2.9 |
| Autolyzed and hydrolyzed yeast extract | 2.8 |
| Monosodium glutamate | .87 |
| Smoked Torula yeast | 1.4 |
| Vegetable gum stabilizer | .07 |
| Corn oil | 9.5 |
| FDC Red #2 (red coloring) | .1 |
| FDC Red #4 (red coloring) | .36 |
| Caramel | .1 |

*Example III*

Another bacon product was prepared from ingredients in the following proportions substantially following the process steps as set forth in Example I:

| | Percent |
|---|---|
| Soy bean fibers—60% moisture | 50.00 |
| Soya sodium proteinate | 2.00 |
| Albumin | 4.00 |
| Autolyzed and hydrolyzed yeast extract | 3.00 |
| Monosodium glutamate | 1.00 |
| Smoked Torula yeast | 1.00 |
| Vegetable gum stabilizer | .07 |
| Corn oil | 8.52 |
| FDC Red #2 color | .09 |
| FDC Red #4 color | .23 |
| Caramel | .09 |
| Water | 30.00 |

*Example IV*

Another bacon product was prepared from ingredients in the following proportions substantially following the process as set forth in Example I:

| | Percent |
|---|---|
| Soybean fibers—60% moisture | 35.00 |
| Soya sodium proteinate | 5.00 |
| Albumin | 4.00 |
| Autolyzed and hydrolyzed yeast extract | 3.00 |
| Monosodium glutamate | 1.00 |
| Smoked Torula yeast | 1.00 |
| Vegetable gum stabilizer | .07 |
| Corn oil | 16.00 |
| FDC Red #2 color | .09 |
| FDC Red #4 color | .23 |
| Caramel | .09 |
| Water | 34.42 |

Example V

Another bacon product was prepared from ingredients in the following proportions:

| | Percent |
|---|---|
| Sesame seed protein fibers 58% moisture | 25.00 |
| Soya sodium proteinate | 2.00 |
| Albumin | 9.40 |
| Autolyzed and hydrolyzed yeast extract | 3.00 |
| Monosodium glutamate | 1.00 |
| Smoked Torula yeast | 1.00 |
| Guar gum | .09 |
| Corn oil | 10.00 |
| Water | 48.50 |

Water, soybean proteinate binder, albumin, autolyzed and hydrolyzed yeast extract, monosodium glutamate, smoked Torula yeast and guar gum stabilizer are mixed in the proportions indicated above at room temperature. Corn oil is then added thereto and this combination is then mixed for five minutes. Spun and stretched sesame seed protein fibers in the indicated proportion, cut in lengths of about one inch are then added to this mixture and a complete mixing in an aluminum foil encased tray 14″ by 16″ in size is carried out, whereby the fibers are dispersed in the initial binder-containing mixture. After thoroughly mixing the ingredients to form a mass having a dough-like consistency, a roller is employed to level out the ingredients to form a single-layered mass of about 1½ inches in height.

The mass is then cooked as previously described in Example I to form a slab of about 1½ inches in height, 18 inches in length and 14 inches in width. The slab is then cut to desired slice lengths and individual slices are then cut therefrom. These slices are then subjected to a color-stamping press whereby the color of bacon is imprinted on each of said slices. The slices are then smoked in a smoking chamber until the desired simulated appearance of smoked bacon slices is obtained.

It is to be understood that the invention is not limited to the specific embodiments described above. Various modifications can be made in the inventive products and the process of making the same without departing from the spirit or scope of the invention.

What is claimed is:

1. A vegetable base high protein food product consisting essentially of a coherent body of molecularly-oriented man-made fibers of natural vegetable protein with said fibers in random position and at least in substantially unoriented fashion in said food product and held together by means of an edible binder comprising albumin admixed with an edible proteinate, said product containing meat-like flavoring and having zones simulating in appearance lean portions of meat of animal flesh type and other zones simulating in appearance non-lean portions, said zones simulating the appearance of said lean portions containing a higher proportion of albumin in the binder than used in the non-lean portions.

2. A vegetable base high protein food product which is free of fat coated portions comprising a coherent, bacon-shaped slice of molecularly-oriented man-made fibers of natural vegetable protein with said fibers in random position and at least in substantially unoriented fashion in said food product and held together by means of an edible binder comprising albumin and neutralized soya protein, said product containing bacon-like flavoring, and having areas simulating in appearance the fat-like portion of natural meat and other areas simulating in appearance the lean portion of natural bacon.

3. A vegetable base high protein food product comprising a coherent, substantially fat-free, bacon-shaped smoked slice of molecularly-oriented man-made fibers of natural vegetable protein with said fibers in random position and at least in substantially unoriented fashion in said food product and held together by a proteinaceous binder comprising an aqueous dispersion of albumin and a member selected from the group consisting of alkali metal and alkaline earth metal soya proteinate, said product containing bacon-like flavoring, and having areas simulating in appearance the fat-like portion of natural bacon and other areas simulating in appearance the lean portion of natural bacon.

4. A vegetable base high protein food product comprising a substantially fat-free ribbon of molecularly-oriented man-made fibers of natural vegetable protein with said fibers in random position and at least in substantially unoriented fashion in said food product and held together by a proteinaceous binder comprising an aqueous dispersion of albumin and a member selected from the group consisting of alkali metal and alkaline earth metal soya proteinate, said product containing meat-like flavoring, and having areas simulating in appearance the fat-like portions of natural meat and other areas simulating in appearance the lean portions of natural meat.

5. A vegetable base high protein food product which is free of coated fibers comprising a substantially fat-free, sliceable slab of molecularly-oriented man-made fibers of natural vegetable protein with said fibers in random position and at least in substantially unoriented fashion in said food product and held together by a proteinaceous binder comprising an aqueous dispersion of albumin and a member selected from the group consisting of alkali metal and alkaline earth metal soya proteinate, said product containing meat-like flavoring, and having areas simulating in appearance the fat-like portions of natural meat and other areas simulating in appearance the lean portions of natural meat.

6. A sliceable vegetable base high protein product comprising a heat-set, substantially fat-free, slab of a multiplicity of alternatively disposed layers of molecularly-oriented man-made fibers of natural vegetable protein, said fibers being held together by means of an edible binder comprising a mixture of albumin and neutralized soya protein, said product containing meat-like flavoring and at least one but not all of said layers being colored to simulate the appearance of lean natural meat, thereby imparting to the slab and to the slices cut transversely therefrom, the appearance of a food product having the lean and the fat-like portions of natural meat.

7. A sliceable vegetable base high protein product comprising a heat-set, transversely-sliceable slab of a multiplicity of alternatively disposed layers of molecularly-oriented man-made fibers of natural vegetable protein held together by means of an edible proteinaceous binder comprising a mixture of albumin and neutralized soya protein, said fibers being disposed randomly in at least substantially unoriented fashion in each layer comprising said fibers and proteinaceous binder, said product containing bacon-like flavoring material and at least one but not all of said layers being colored to impart thereto the color of the lean portion of bacon, whereby said slab has the appearance and texture of a natural bacon slab, said colored layers comprising the simulated lean portion of bacon and said uncolored layers simulating the fat-like portion of bacon, so that transversely cut slices obtained therefrom have the appearance of natural bacon slices.

8. A sliceable vegetable base high protein product comprising a heat-set, transversely sliceable, slab of a multiplicity of alternatively disposed layers of molecularly-oriented man-made fibers of natural vegetable protein held together by a proteinaceous binder comprising an aqueous dispersion of albumin and a member selected from the group consisting of alkali metal and alkaline earth metal soya proteinate, said fibers being disposed randomly in at least substantially unoriented fashion in each layer comprising said fibers and proteinaceous binder, said product containing bacon-like flavoring and at least some but not all of said layers being colored to impart the color of the lean portion of bacon to said colored layers, whereby said slab and the slices cut therefrom have the appearance and texture of a natural bacon product, said colored layers comprising a simulated lean portion of bacon and said uncolored layers simulating a fat-like portion of bacon.

9. A sliceable vegetable base high protein product comprising a heat-set, transversely sliceable slab of a multiplicity of alternatively disposed layers of molecularly-oriented man-made fibers of soybean protein held together by a proteinaceous binder comprising an aqueous dispersion of albumin and a member selected from the group consisting of alkali metal and alkaline earth metal soya proteinate, said fibers being from about ¼ inch to about five inches in length and being disposed randomly in at least substantially unoriented fashion in each layer comprising said fibers and proteinaceous binder, said product containing bacon-like flavoring, and at least some but not all of said layers being colored to impart the color of the lean portion of bacon to said colored layers, whereby said slab and the slices cut therefrom have the appearance and texture of a nautral bacon product, said colored layers comprising the simulated lean portion of bacon and said uncolored layers simulating the fat-like portion of bacon.

10. A sliceable vegetable base high protein product comprising a heat-set, transversely sliceable slab of a multiplicity of alternatively disposed layers of molecularly-oriented man-made fibers of soybean protein held together by a proteinaceous binder comprising an aqueous dispersion of albumin and a member selected from the group consisting of alkali metal and alkaline earth metal soya proteinate, said fibers being from ¼ inch to five inches in length and being disposed randomly in at least substantially unoriented fashion in each layer comprising said fibers and proteinaceous binder, said product containing bacon-like flavoring, and at least some but not all of said layers being colored to impart the color of the lean portion of bacon to said colored layers, the colored layers containing a higher proportion of albumin in the binder than the non-colored layers, whereby said slab and the slices cut therefrom have the appearance, texture and degree of firmness of a natural bacon product, said colored layers comprising the simulated lean portion of bacon and said uncolored layers simulating the fat-like portion of bacon.

11. A sliceable vegetable base high protein product comprising a heat-set, transversely sliceable smoked slab of alternatively disposed layers of molecularly-oriented man-made fibers of soybean protein held together by a proteinaceous binder comprising an aqueous dispersion of albumin and a member selected from the group consisting of alkali metal and alkaline earth metal soya proteinate, said fibers comprising 25 to 70% by weight of the slab, having a moisture content of from 50 to 70% by weight, and being from about ¼ inch to about 5 inches in length and being disposed randomly in at least substantially unoriented fashion in each layer comprising said fibers and proteinaceous binder, said product containing bacon-like flavoring and at least some but not all of said layers being colored to impart the color of the lean portion of bacon to said colored layers, the colored layers containing a higher proportion of albumin in the binder than the non-colored layers, whereby said slab and the slices cut therefrom have the appearance, texture and degree of firmness of a natural bacon product, said colored layers comprising the simulated lean portion of bacon and said uncolored layers simulating the fat-like portion of bacon.

12. A process of preparing a vegetable base high protein food product which comprises forming a body of man-made molecularly-oriented fibers of natural vegetable protein with said fibers in random position and at least in substantially unoriented fashion in said body and held together by an edible binder including albumin, incorporating a meat-like flavoring material, coloring at least some but not all of the areas thereof to impart to such colored areas the appearance of the lean portion of natural meat, and adding a higher percentage of albumin to said colored areas than to said non-colored areas, whereby said product has the appearance of a meat having lean and non-lean portions with said lean appearing portions being more firm than said non-lean appearing portions.

13. A process of preparing a bacon-like food product which comprises forming a ribbon of molecularly-oriented man-made fibers of soybean protein held together by a proteinaceous binder comprising an aqueous dispersion of albumin and a member selected from the group consisting of alkali metal and alkaline earth metal soya proteinate, incorporating a bacon-like flavoring material, cutting said ribbon into strip-shaped slices and coloring at least some but not all areas of said strip-shaped slices to impart to said colored areas the appearance of the lean portion of natural bacon, whereby said product has the appearance of natural bacon having lean and fat-like portions.

14. A process of preparing a meat-like food product which comprises forming a slab of man-made molecularly-oriented fibers of natural vegetable protein held together by a proteinaceous binder comprising an aqueous dispersion of albumin and a member selected from the group consisting of alkali metal and alkaline earth metal soya proteinate, incorporating a meat-like flavoring material, heat-setting said slab, and slicing said slab into strip-shaped slices, and coloring at least some but not all of the areas of said slices to impart to such colored areas the appearance of the lean portion of natural meat, whereby said product has the appearance of natural meat having lean and fat-like portions.

15. A process of preparing a bacon-like food product which comprises forming a slab of molecularly-oriented man-made fibers of soybean protein held together by a proteinaceous binder comprising an aqueous dispersion of albumin and a member selected from the group consisting of alkali metal and alkaline earth metal soya proteinate, said soybean fibers being disposed in substantially oriented fashion in said slab, incorporating a bacon-like flavoring material, heat-setting said slab, transversely slicing said slab into bacon-shaped slices and coloring at least some but not all of the areas of said slices by subjecting the same to color-stamping means to impart to the colored areas the appearance of the lean portion of natural bacon, whereby said stamped product has the appearance of natural bacon having lean and fat-like portions.

16. A process of preparing a sliceable meat-like product which comprises forming an initial layer of molecularly-oriented man-made fibers of natural vegetable protein held together by means of an edible binder, then forming at least one other layer in like manner and placing the same on said initial layer, incorporating a meat-like flavoring material to the plurality of layers, treating at least one but not all of said layers with food coloring agents to impart the color of the lean portion of natural meat thereto, and heat-setting the plurality of layers to form a slab having the appearance of a natural meat having lean and fat-like portions.

17. A process of preparing a transversely-sliceable bacon-like product which comprises forming an initial layer of molecularly-oriented man-made fibers of soybean protein held together by a proteinaceous binder comprising an aqueous dispersion of albumin and a member selected from the group consisting of alkali metal and alkaline earth metal soya proteinate, said soybean fibers being disposed randomly in at least substantially unoriented fashion in said layer comprising said fibers and proteinaceous binder, forming at least one other layer in like manner and placing the same on said initial layer, incorporating bacon-like flavoring into the multiplicity of layers and incorporating coloring agents to at least one but not all of said layers to impart the appearance of the lean portion of natural bacon thereto, heat-setting said layers by heating to a temperature of between about 160° F. and about 200° F. whereby a slab having the appearance and texture of a natural sliceable bacon product is formed, said colored portions comprising a simulated lean portion and said uncolored layers simulating a fat-like portion.

18. A process according to claim 18, in which said heat-set slab is sliced and in which each slice is subsequently smoked individually to enhance the appearance and taste thereof.

References Cited by the Examiner
UNITED STATES PATENTS

| | | | |
|---|---|---|---|
| 2,478,520 | 8/1949 | Baur | 99—107 |
| 2,682,466 | 6/1954 | Boyer | 99—14 |
| 3,210,195 | 10/1965 | Kjelson et al. | 99—14 |

A. LOUIS MONACELL, *Primary Examiner.*

D. M. STEPHENS, *Assistant Examiner.*